United States Patent
Boyd et al.

(10) Patent No.: US 12,061,774 B2
(45) Date of Patent: Aug. 13, 2024

(54) PROVIDING CONTEXTUAL DATA FOR CANDIDATE MESSAGE RECIPIENTS

(71) Applicant: Snap Inc., Santa Monica, CA (US)

(72) Inventors: Nathan Kenneth Boyd, Los Angeles, CA (US); Imani Ritchards, Los Angeles, CA (US); David Phillip Taitz, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/156,105

(22) Filed: Jan. 18, 2023

(65) Prior Publication Data
US 2024/0241617 A1    Jul. 18, 2024

(51) Int. Cl.
*G06F 3/048* (2013.01)
*G06F 3/0482* (2013.01)
*G06F 3/0484* (2022.01)

(52) U.S. Cl.
CPC .......... *G06F 3/0482* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 9,710,661 | B2* | 7/2017 | Choi | G06F 21/10 |
| 2010/0110105 | A1* | 5/2010 | Kinnunen | G01C 21/3664 |
| | | | | 345/629 |
| 2014/0181219 | A1* | 6/2014 | Wang | H04L 51/52 |
| | | | | 709/206 |
| 2018/0241871 | A1* | 8/2018 | Sarafa | H04W 12/0431 |

* cited by examiner

Primary Examiner — Thanh T Vu
(74) Attorney, Agent, or Firm — SCHWEGMAN LUNDBERG & WOESSNER, P.A.

(57) ABSTRACT

Aspects of the present disclosure involve a system comprising a computer-readable storage medium storing a program and method for providing contextual data for candidate recipients. The program and method provide for receiving, from a device of a user, an indication of first user input to select recipients for a message generated by the user; in response to receiving the indication of first user input, determining a first set of candidate recipients, from among plural candidate recipients, having a respective active content collection associated therewith, and determining a second set of candidate recipients having available location data associated therewith; and causing the device to display a recipient selection interface with a respective cell for each candidate recipient. The recipient selection interface differentiates display of the respective cells for the first set of candidate recipients, and further differentiates display of the respective cells for the second set of candidate recipients.

11 Claims, 10 Drawing Sheets

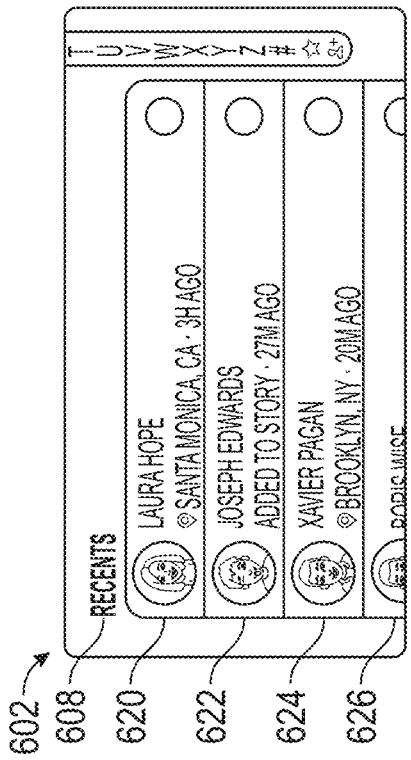
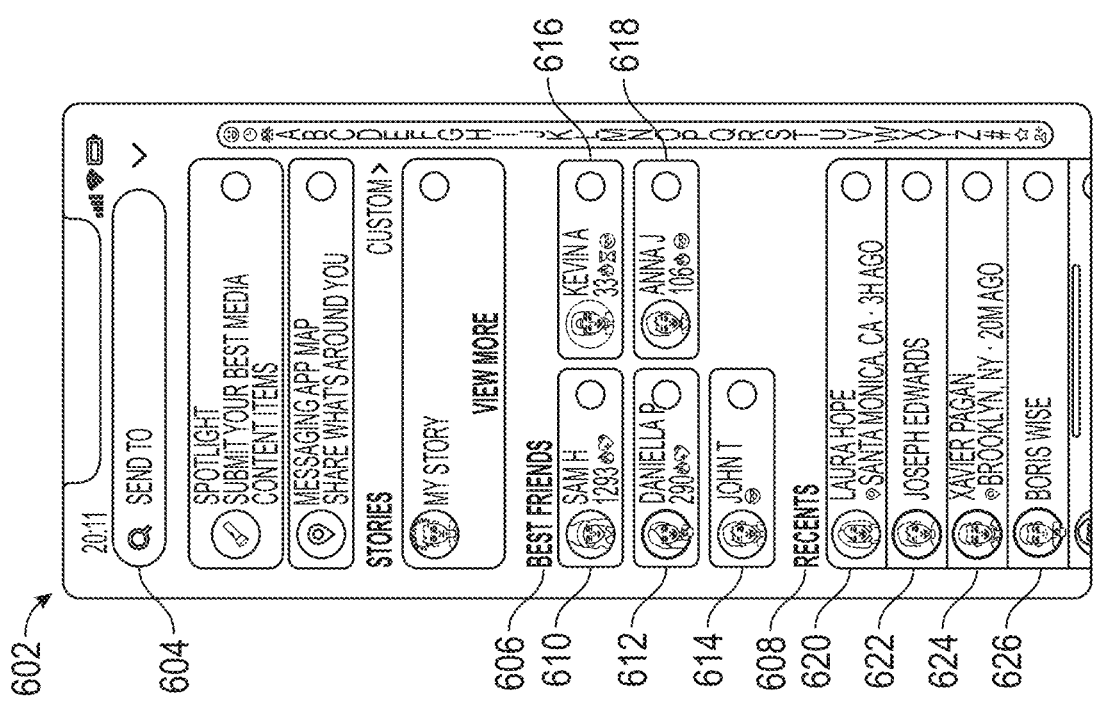
FIG. 6B
FIG. 6A

PROVIDING CONTEXTUAL DATA FOR CANDIDATE MESSAGE RECIPIENTS

TECHNICAL FIELD

The present disclosure relates generally to a messaging system, including providing contextual data for candidate message recipients.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIGS. 6A-6B illustrate a recipient selection interface which provides contextual data for candidate recipients, in accordance with some examples.

DETAILED DESCRIPTION

A messaging system typically allow users to exchange media content items (e.g., messages, images and/or video) with one another in a message thread. As described herein, a messaging system may provide a recipient selection interface for selecting recipients of a media content item.

The disclosed embodiments relate to a system for displaying contextual data within a recipient selection interface. The recipient selection interface lists candidate recipients (e.g., contacts, friends) of a user, and allows the user to select which recipients are to receive a media content item (e.g., as generated by the user). The contextual data within the recipient selection interface indicates which candidate recipients have an active content collection, where an active content collection corresponds to a collection of media content that has been created or updated within a predefined time period (e.g., 24 hours). The recipient selection interface may depict a circle around the avatar of those candidate recipients. User selection of a circled avatar may provide for playback of the corresponding content collection, or may surface a friendship profile associated with the user and candidate recipient corresponding to the selected circled avatar. The contextual data may further indicate which candidate recipients have available location data, where the location data is considered "available" based on user-specified privacy settings for the candidate recipients. The recipient selection interface may include supplemental text (e.g., subtext) corresponding to the available location data, where is subtext is presented with the names and avatars of those candidate recipients.

The contextual data provided by the system facilitates in identifying or highlighting candidate recipients with active content collections and/or available location data. Without providing such contextual data, end users may be required to manually navigate away from the recipient selection interface to other user interface(s), in order to identify candidate recipients with active content collections and/or available location data. For example, the user may wish to send a message (e.g., media content item) to candidate recipients with active content collections (e.g., as this suggests recent interaction) and/or candidate recipients in a certain geographical areas (e.g., nearby). The system saves time for the user, and/or reduces computational resources/processing power associated with navigating to other user interfaces. Moreover, the contextual data may be more engaging for users of the system.

Networked Computing Environment

Figure 1:
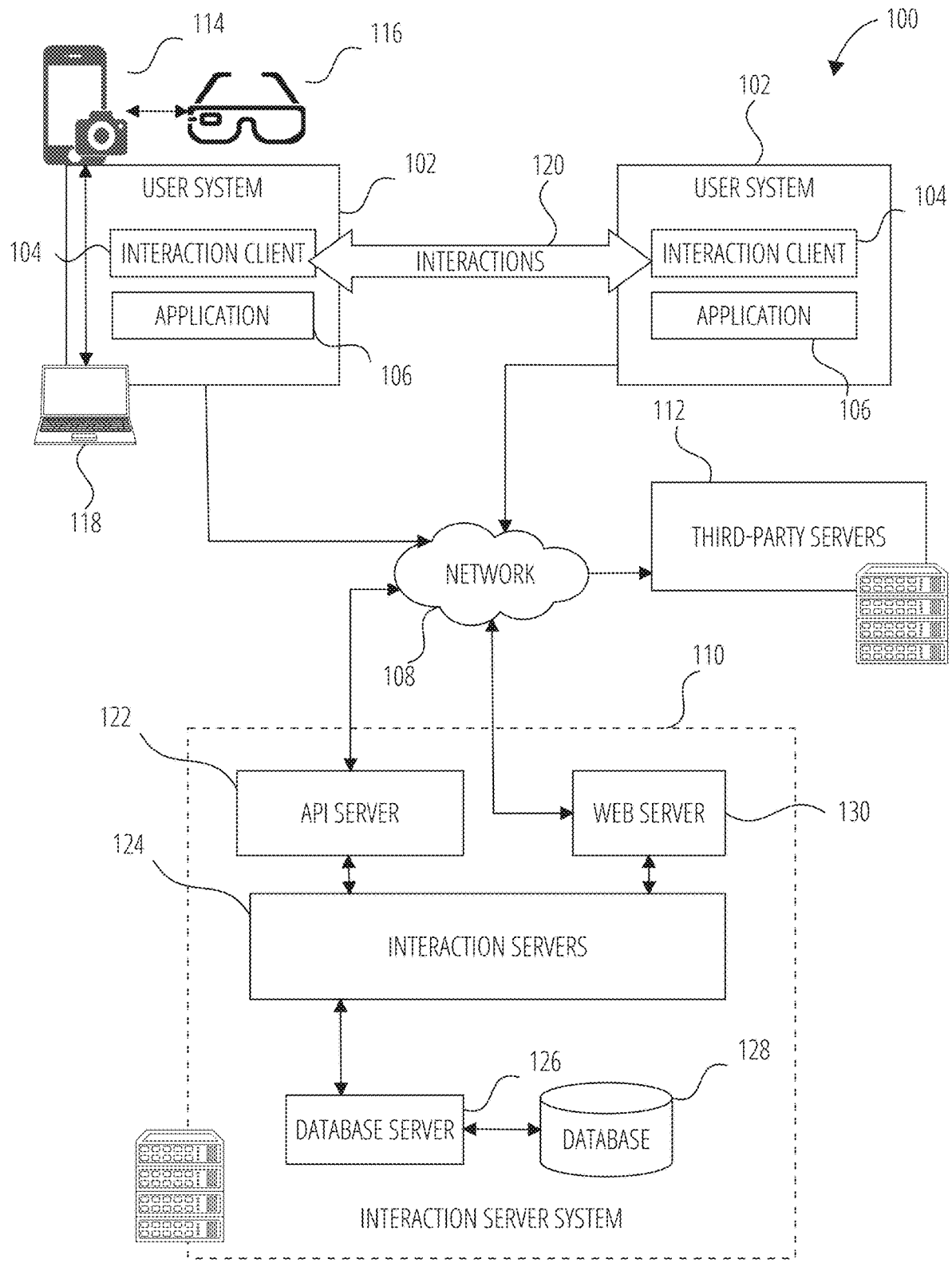
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
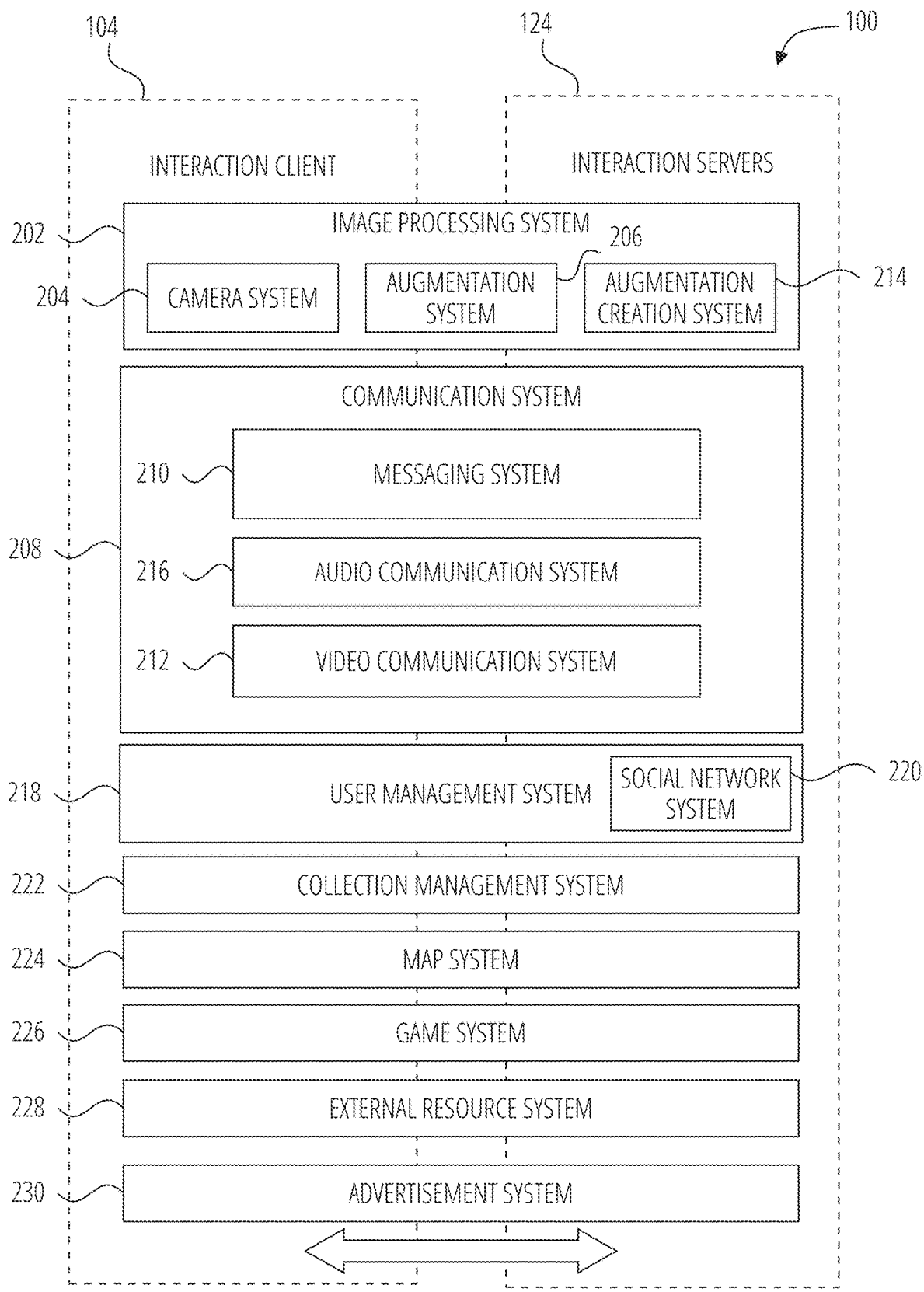
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of the user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and includes a social network system 220 that maintains information regarding relationships between users of the interaction system 100.

A collection management system 222 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 222 may also be responsible for publishing an icon that provides notification of a particular collection to the user interface of the interaction client 104. The collection management system 222 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 222 employs machine vision (or image recognition technology) and content rules to curate a content collection automatically. In certain examples, compensation may be paid to a user to include user-generated content into a collection. In such cases, the collection management system 222 operates to automatically make payments to such users to use their content.

A map system 224 provides various geographic location functions and supports the presentation of map-based media content and messages by the interaction client 104. For example, the map system 224 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 226 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 228 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 230 operationally enables the purchasing of advertisements by third parties for presentation to end-users via the interaction clients 104 and also handles the delivery and presentation of these advertisements.

Data Architecture

Figure 3:
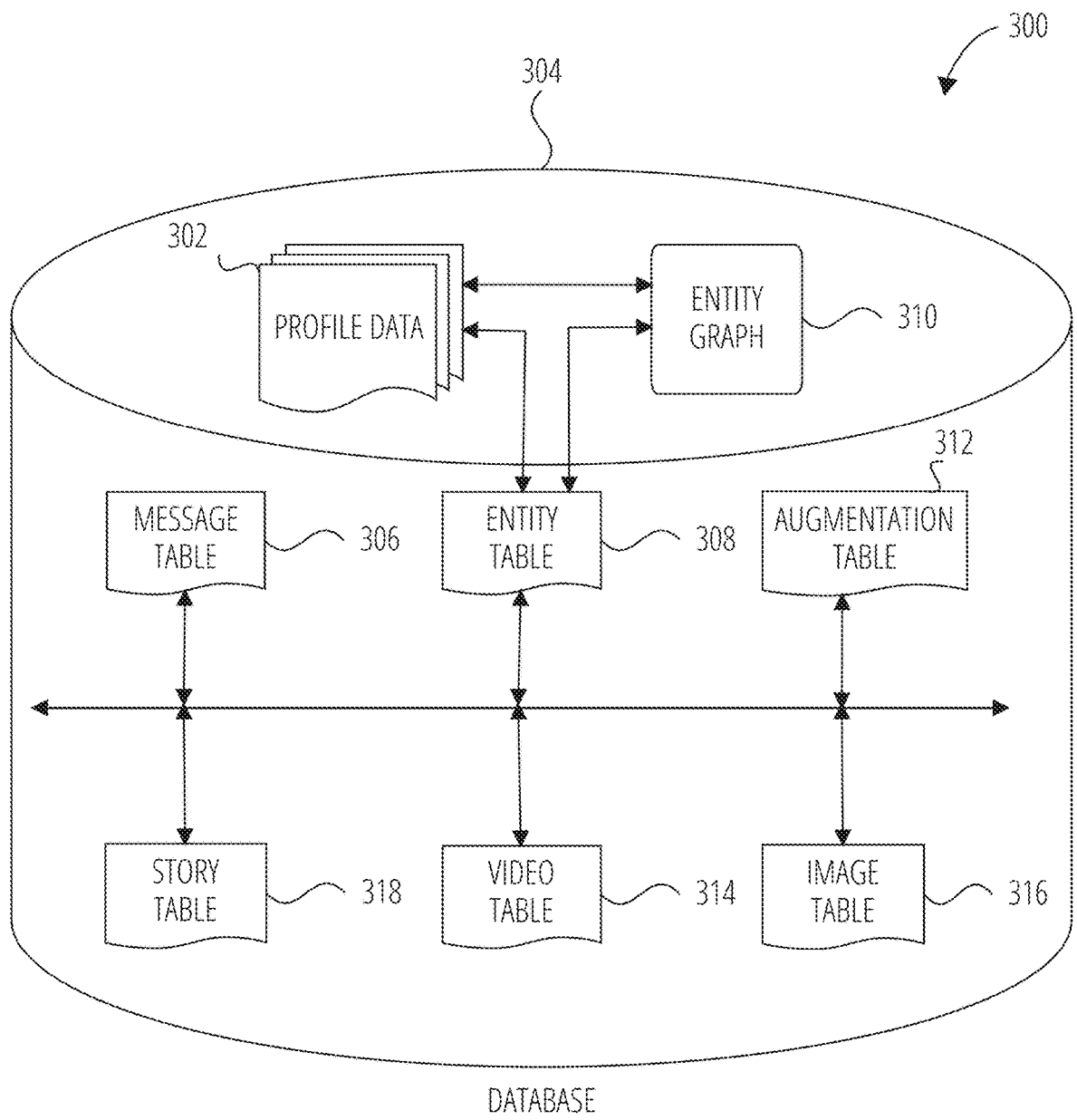
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e g, referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations) A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e g, each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
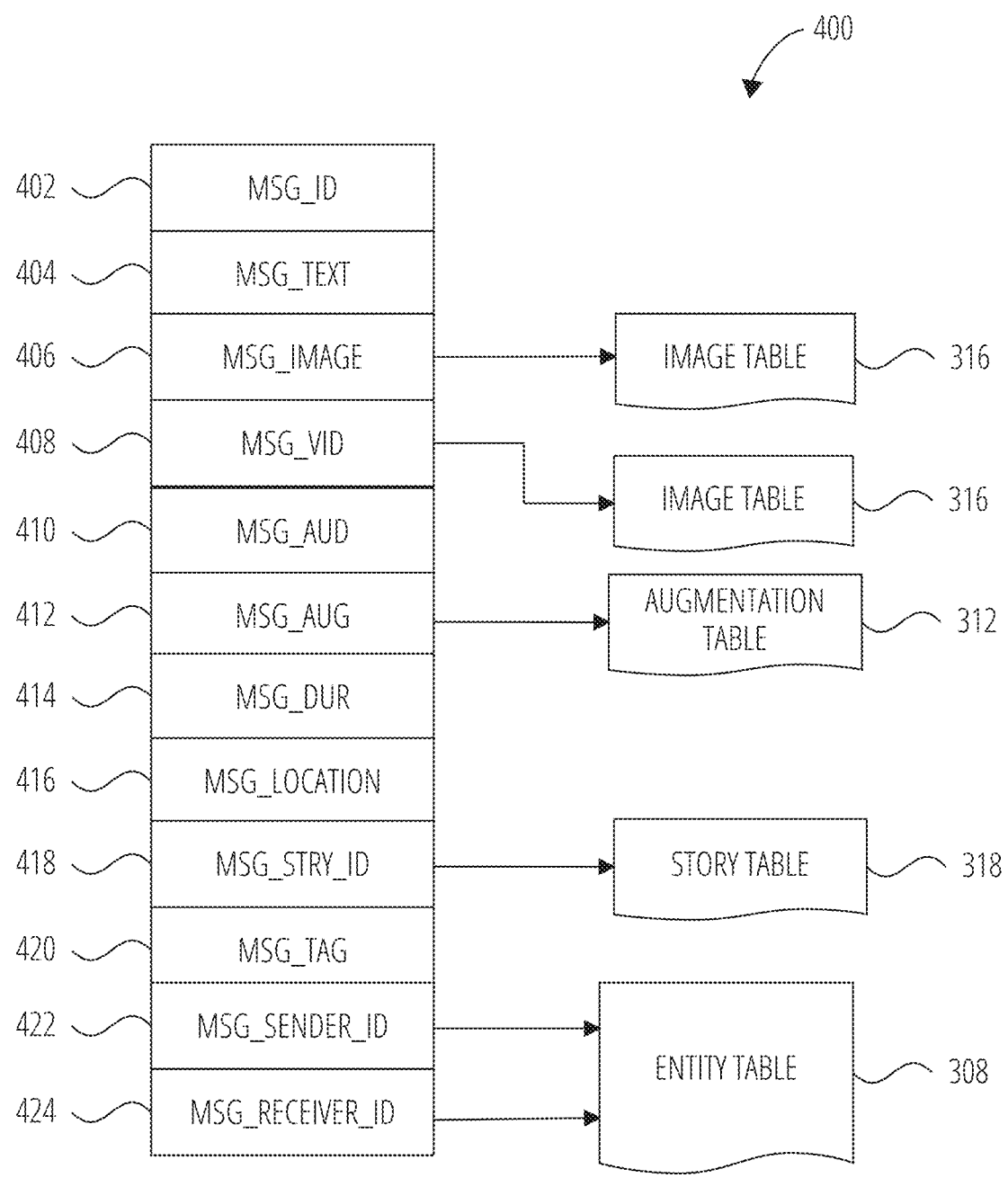
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e g, a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Figure 5:
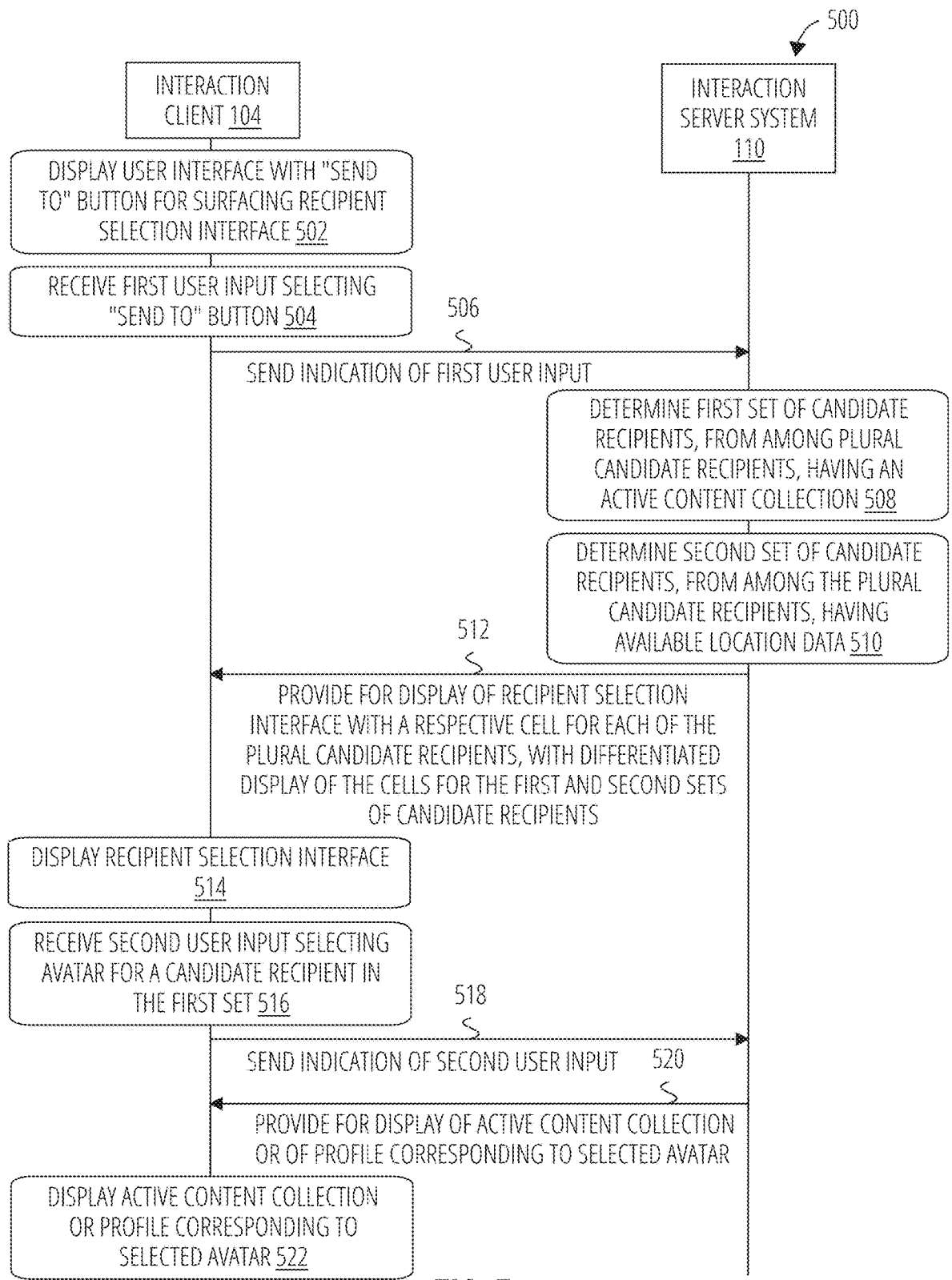
FIG. 5 is an interaction diagram illustrating a process for providing contextual data for candidate recipients, in accordance with some examples.

FIG. 5 is an interaction diagram illustrating a process 500 for providing contextual data for candidate recipients, in accordance with some examples. For explanatory purposes, the process 500 is primarily described herein with reference to the interaction client 104 and the interaction server system 110 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

In one or more embodiments, the interaction client 104 is running on a user system 102 associated with a user of the interaction system 100. The user is associated with a user account of the interaction system 100 in conjunction with the user management system 218. For example, the user is identified by the user management system 218 based on one or more unique identifiers (e.g., a messaging system identifier, email address and/or a device identifier) associated with the user accounts for the user. In some embodiments, the user management system 218 implements and/or works in conjunction with the social network system 220 which is configured to identify other users (e.g., friends) with which the user of the interaction client 104 has relationships.

As described herein, the interaction system 100 provides for displaying contextual data within a recipient selection interface. The recipient selection interface lists candidate recipients (e.g., contacts, friends) of a user, and allows the user to select which recipients are to receive a message (e.g., a media content item) generated by the user. The contextual data within the recipient selection interface indicates which candidate recipients have an active content collection, where an active content collection corresponds to a collection of media content that has been updated within a predefined time period (e.g., 24 hours). The recipient selection interface may depict a circle around the avatar of those candidate recipients. User selection of a circled avatar may provide for playback of the corresponding content collection, or may surface a friendship profile associated with the user and candidate recipient corresponding to the selected circled avatar. The contextual data may further indicate which candidate recipients have available location data, where the location data is made available by privacy settings as set by the candidate recipients. The recipient selection interface may include supplemental text (e.g., subtext) for the location data, together with the names and avatars of those candidate recipients.

At block 502, the interaction client 104 displays a user interface, which may include a "send to" button for surfacing a recipient selection interface. In one or more embodiments, the user interface with the "send to" button corresponds to a message preview interface for previewing a media content item. The message preview interface includes a media content item corresponding to an image (e.g., photo/video) captured by a camera of the user system 102.

For example, the image may correspond to a photo/video (e.g., stored in RAM) that is displayed immediately after image capture (e.g., upon release of a shutter button). In another example, the image corresponds to photo/video selected from a local photo library of the user system 102, and/or an from a photo library associated with a user account of the interaction system 100.

At block 504, the interaction client 104 receives first user input selecting the "send to" button. At operation 506, the interaction client 104 sends an indication of the first user input received at block 504 to the interaction server system 110.

As noted above, user selection of the "send to" button provides for the interaction client 104 to surface the recipient selection interface. As described herein, the recipient selection interface allows the user to select, from plural candidate recipients, which recipients are to receive the media content item. The interaction server system 110, in conjunction with the user management system 218 and social network system 220, is configured to determine candidate recipients of the message based on the contacts (e.g., friends) of the user at the interaction client 104.

With respect to blocks 508-510, the interaction server system 110 is configured to identify which of the plural candidate recipients have an active content collection and/or available location data. With respect to active content collection(s), the interaction server system 110 at block 508 determines a first set of candidate recipients, from among the plural candidate recipients, having an active content collection.

As noted above, the collection management system 222 provides for managing content collections, where a content collection (e.g., a story) corresponds to a collection of media (e.g., text, image video, and audio data). Based on privacy settings as set by the candidate recipients, the user of the interaction client 104 may access certain content collections for viewing. Access to the content collections, as maintained by collection management system 222, is based at least in part on the type of content collection. For example, a content collection can be of the type: normal (e.g., viewable by all contacts/friends of the user based on privacy settings), private (e.g., only viewable by contacts selected by the user), or shared (e.g., collaborative content collections where members of the group can view and/or add media to the content collection based on privacy settings). Moreover, a content collection is considered "active" when the content collection was updated within a predefined time period (e.g., the content collection that created, added or otherwise updated within a the last 24 hours). The predefined time period may be set by a system administrator.

Thus, the interaction server system 110 is configured to determine which content collections are viewable to the user of the interaction client 104 (e.g., based on the type of content collection and privacy settings), and to determine if the viewable content collections are "active" (e.g., updated within the predefined time period). As such, the interaction server system 110 at block 508 identifies the first set of candidate recipients having an active content collection.

With respect to available location data, the interaction server system 110 at block 510 determines a second set of candidate recipients, from among the plural candidate recipients, having available location data. As noted above, the map system 224 provides for individual users to their share their location with other users of the interaction system 100 via the interaction clients 104. For example, the location information is displayed as an appropriate avatar within the context of a map interface of the interaction client 104 to selected users.

In cases where individual users share their location to select users (e.g., the user of the interaction client 104) for viewing within the map interface, the interaction system 100 further provides for their location to be shareable to the select users within the recipient selection interface. Thus, the interaction server system 110 in conjunction with the map system 224 is configured to determine which of the candidate recipients have available location data (e.g., by via sharing their location with the user of the interaction client 104). As such, the interaction server system 110 at block 510 identifies the second set of candidate recipients having available location data.

At operation 512, the interaction server system 110 provides for the interaction client 104 to display the recipient selection interface, and the interaction client 104 displays the recipient selection interface (block 514). As discussed further below with respect to FIGS. 6A-6B, the interaction server system 110 is configured sort all candidate recipients under different section headings. By way of non-limiting example, the section headings may include: "best" friends (e.g., which the user had previously identified as closest/best friends within the interaction client 104), "recent" friends (e.g., which the user has previously communicated with via the interaction system 100, with the most recent being at the top of the list), other "friends" (e.g., which the user is friends with) and/or suggested "quick add" friends (e.g., which the user is not friends with). The interaction server system 110 performs such sorting with respect to the section headings based on the profile information stored in association with the user management system 218 and/or the relationship information stored in association with the social network system 220.

In addition, the recipient selection interface includes a respective cell for each of the candidate recipients. Thus, each of the above-noted section headings may include a list of candidate recipients represented by respective cells. Each cell may include an avatar and the name of the respective candidate recipient. In addition, each cell may be selectable (e.g., via a checkbox) to designate the candidate recipient as a recipient of the media content item. The cells may vary in size, with predefined section headings (e.g., best friends) having half-width cells and other section headings (e.g., recents) having full-width cells.

Moreover, the recipient selection interface differentiates display of the cells for the first set of candidate recipients, and for the second set of candidate recipients, relative to the remaining candidate recipients. In one or more embodiments, the recipient selection interface differentiates display for the first set of candidate recipients by depicting a circle around their avatars within their respective cells. By way of non-limiting example, the circle may be a blue circle or a gray circle. The circle may be depicted regardless of whether the active content collection has been previously viewed by the user. In a case where the active content collection is private (e.g., only viewable by contacts, including the user, as specified by the candidate recipient), the recipient selection interface may further depict a predefined icon (e.g., a lock icon) at the bottom of the corresponding depicted circle.

As noted above, the cell sizes may vary based on section heading. In one more embodiments, the full-width cells may display subtext which is not displayed for the half-width cells. For example, the subtext may include contextual data such as a birthday or other life event associated with the respective candidate recipient. As an alternative or as a supplement to depicting avatar circles for the first set of candidate recipients, the recipient selection interface may indicate active content collections via subtext. For example, the subtext may indicate that the respective candidate recipient updated their content collection (e.g., "added to story") and may indicate a corresponding time (e.g., "27 minutes ago").

For the second set of candidate recipients, the recipient selection interface differentiates display for their respective cells via subtext (e.g., for full-width cells and not for half-width cells). For example, the subtext may indicate the city and state (or equivalent) together with the time last seen (e.g., "20 mins ago"). In a case where existing subtext is already provided (e.g., a birthday), the interaction server system 110 may have predefined rules for which subtext to display. By way of non-limiting example, birthdays may be prioritized over (e.g., displayed instead of) active content collections, and active content collections may be prioritized over available location data.

In a case where the location data is no longer available, the recipient selection interface may remove the subtext relating to location from the respective cell. For example, location data may become unavailable based on privacy setting changes and/or the corresponding candidate recipient having not logged into the interaction client 104 for a predefined time period.

Thus, with respect to operations 508-514 the interaction server system 110 determines the first set of candidate recipients having active content collections, and the second set of candidate recipients having available location data. The interaction server system 110 causes the interaction client 104 to display a recipient selection interface which differentiates display for the first set of candidate recipients (e.g., with circled avatars and/or via subtext), and which differentiates display for the second set of candidate recipients (e.g., via subtext).

In one or more embodiments, the recipient selection interface is configured to surface additional information in response to user selection of a circled avatar (e.g., corresponding to a candidate recipient with an available content collection). In the example of FIG. 5, the interaction client 104 receives user input selecting the circled avatar for a candidate recipient in the first set of candidate recipients (block 516). The interaction client 104 sends an indication of the second user input to the interaction server system 110 (operation 518).

In response, the interaction server system 110 provides for displaying the additional information corresponding to the selected avatar (operation 520), and the interaction client 104 displays the additional information (block 522). The type of additional information may be set, for example, by a system administrator of the interaction system 100. In a first example, the additional information corresponds to playback of the active content collection for the candidate recipient associated with the selected avatar. For example, the interaction server system 110 provides for the interaction client 104 to playback the set of media content items in the active content collection in an auto-advance manner. The playback of the active content collection may appear as a screen on top of the recipient selection interface. After fully viewing the content collection (e.g., after auto-advancing through all of the media content items in the content collection), the interaction client 104 may revert to the recipient selection interface and switch the color of the corresponding avatar circle (e.g., from a default of blue to gray). Selection of the gray circle will again playback the active content collection for the user to re-watch.

In a second example, the additional information corresponds to presenting a friendship profile between the user of the interaction client 104 and the candidate recipient associated with the selected avatar. In one or more embodiments, the friendship profile includes information that is common to the two users. Such information may include message content, such as but not limited to, images, videos, audio files, attachments, and messages (e.g., text-based messages), with any corresponding annotation data, exchanged within one or more message thread(s) with respect to the two users (e.g., friends). The friendship profile may further indicate the name, birthday, avatar representation(s) and/or other identifying information of the candidate recipient. The friendship profile may be populated at least in part based on the profile data 302 stored in the database 304. The display of a friendship profile is discussed further below with respect to FIG. 7B.

In one or more embodiments, based on administrator settings, the interaction server system 110 provides for the interaction client 104 to playback the active content collection upon user selection of a circled avatar, and to display the corresponding friendship profile upon user selection of a non-circled avatar (e.g., a candidate recipient without an active content collection). Alternatively, based on administrator settings, the interaction server system 110 may provide for the interaction client 104 to simply select or deselect (e.g., via the above-mentioned checkboxes) the candidate recipient as a recipient for the media content item upon user selection of a circled or non-circled avatar.

FIGS. 6A-6B illustrate a recipient selection interface 602 which provides contextual data for candidate recipients, in accordance with some examples. FIG. 6B corresponds to a partial view of the recipient selection interface 602. The recipient selection interface 602 includes a search input box 604, a best friends section header 606, a recents section header 608, and cells 610-626.

The recipient selection interface 602 lists candidate recipients (e.g., contacts, friends) as cells 610-626, and allows the user to select which recipients are to receive a message (e.g., a media content item generated by the user) The search input box 604 allows the user to search via a keyboard interface (e.g., not shown) for particular contacts of the user.

As shown in the example of FIG. 6A, the cells 610-626 include an avatar, name and checkbox for selecting/deselecting the corresponding candidate recipient for receiving a message (e.g., a generated media content item). Selection of particular cells 610-626 may cause the respective checkbox to be checked/unchecked to indicate message recipients. Some of the cells are half-width in size, for example, the cells under the best friends section header 606. Other cells are full-width in size, for example, the cells under the recents section header 608.

As noted above, the recipient selection interface 602 differentiates display for a first set of candidate recipients having an active content collection. In the example of FIG. 6A, the first set of candidate recipients correspond to cells 612, 622, 624 and 626, as their respective avatars appear with a circle. Moreover, the candidate recipient corresponding to cell 612 depicts a lock icon on the circle, to indicate an active content collection that is private (e.g., only viewable by selected contacts, including the user). As an alternative or in addition to circled avatars, the recipient selection interface 602 may differentiate display for the first set of candidate recipients via subtext. As shown in the example of FIG. 6B, cell 622 does not appear with a circled avatar but includes subtext indicating an updated content collection (e.g., "added to story") and a corresponding time (e.g., "27 m ago"). In one or more embodiments, the subtext is limited to full-width cells.

The recipient selection interface 602 also differentiates display for a second set of candidate recipients having available location data (e.g., based on privacy settings as set by the candidate recipients). In the example of FIG. 6B, the second set of candidate recipients correspond to the cells 620 and 624. As shown, the cells 620 and 624 include subtext with the city and state (e.g., "Santa Monica, CA" and "Brooklyn, NY") together with the time last scene (e.g., "3 h mins ago" and "20 m ago").

Figure 7B:
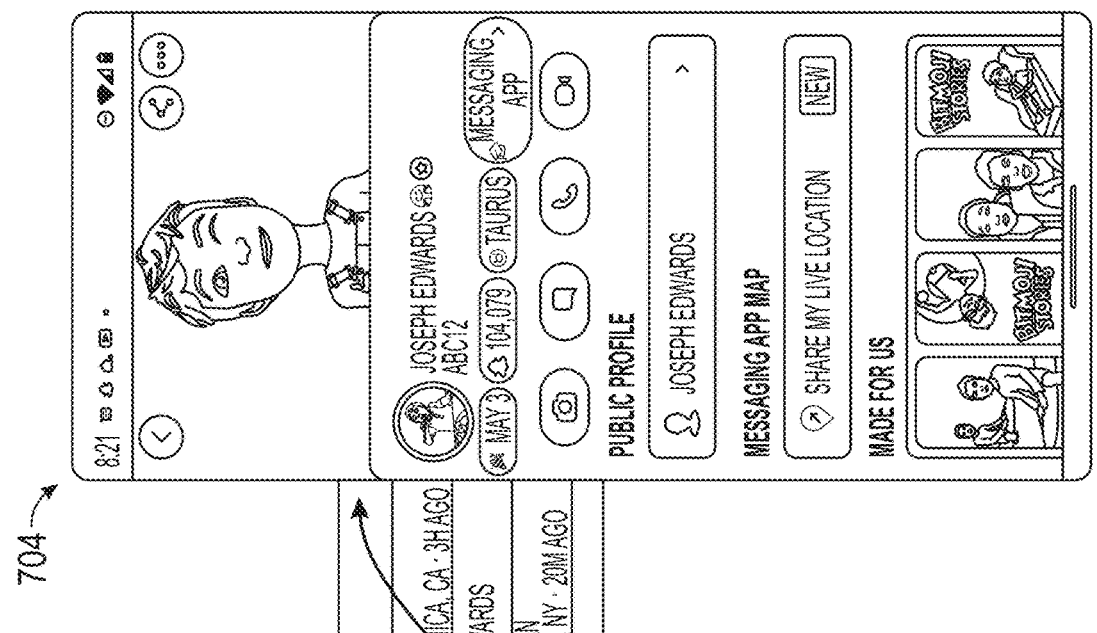
FIGS. 7A-7B illustrate user interfaces for displaying an active content collection or a friendship profile for a candidate recipient, in accordance with some examples.
Figure 7A:
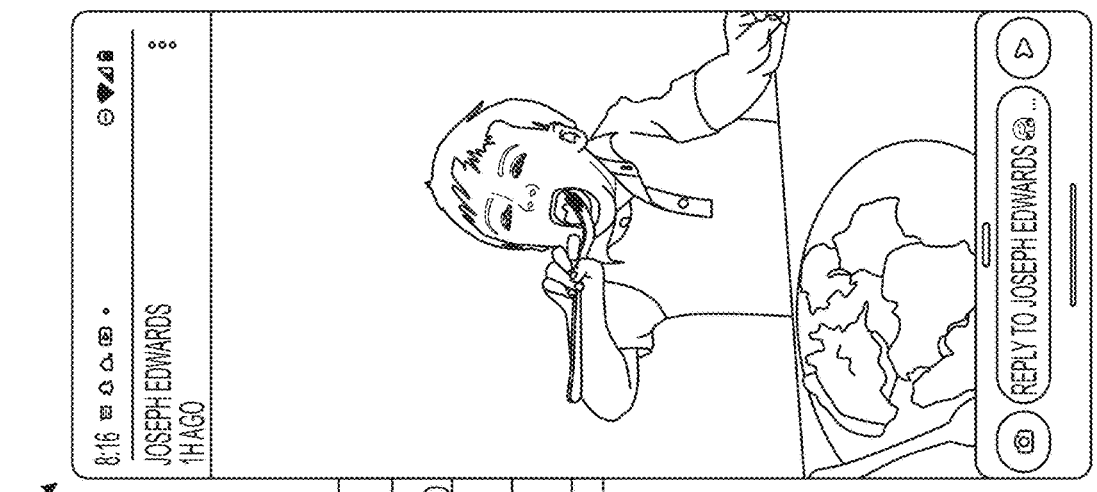

FIGS. 7A-7B illustrate user interfaces for displaying an active content collection or a friendship profile for a candidate recipient, in accordance with some examples. In the example of FIG. 7A, the active content collection 702 is surfaced in response to user selection of a circled avatar (e.g., corresponding to a candidate recipient with an active content collection) for the cell 622. The interaction server system 110 causes the interaction client 104 to playback (e.g., in an auto-advanced manner) the active content collection 702 for the candidate recipient associated with the selected avatar. The playback of the active content collection 702 may appear as a screen on top of the recipient selection interface 602. After fully viewing the content collection (e.g., after auto-advancing through all of the media content items in the content collection), the interaction client 104 may revert to the recipient selection interface 602 and switch the color of the corresponding avatar circle (e.g., from blue to gray for the cell 622). Selection of the gray circle will again playback the active content collection 702 for the user to re-watch.

On the other hand, FIG. 7B illustrates an example in which the friendship profile 704 is surfaced in response to user selection of the circled avatar for the cell 622. As noted above, playback of either the active content collection 702 or display of the friendship profile 704 may be an administrator-based setting. The friendship profile 704 includes information that is common to the user and the candidate recipient associated with the selected avatar for cell 622. As noted above, such information may include message content, such as but not limited to, images, videos, audio files, attachments, and messages (e.g., text-based messages), with any corresponding annotation data, exchanged within one or more message thread(s) with respect to the two users (e.g., friends). The friendship profile 704 may further indicate the name, birthday, avatar representation(s) and/or other identifying information of the candidate recipient.

As noted above, based on system administrator settings, the interaction server system 110 provides for the interaction client 104 to playback the active content collection upon user selection of a circled avatar, and to display the corresponding friendship profile upon user selection of a non-circled avatar (e.g., a candidate recipient without an active content collection). Alternatively, the interaction server system 110 may provide for the interaction client 104 to simply select or deselect the candidate recipient as a recipient for the media content item upon user selection of a circled or non-circled avatar.

Figure 8:
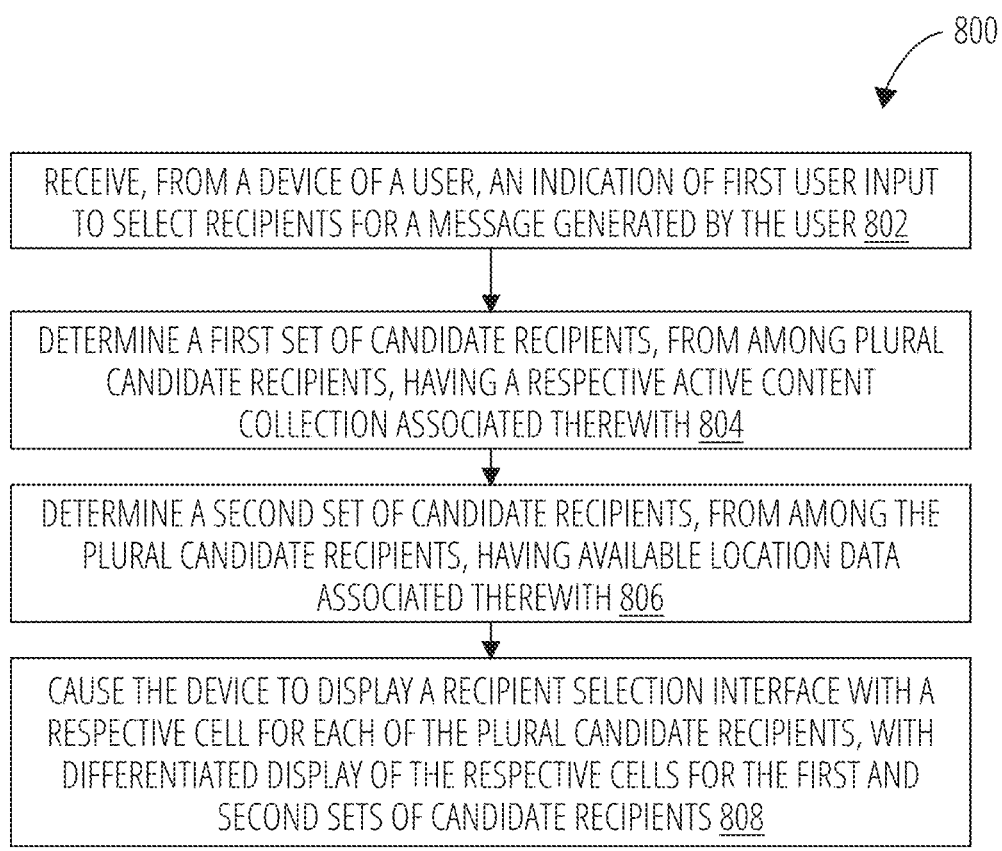
FIG. 8 is a flowchart illustrating a process for providing contextual data for candidate recipients, in accordance with some examples.

FIG. 8 is a flowchart illustrating a process 800 for providing contextual data for candidate recipients, in accordance with some examples. For explanatory purposes, the process 800 is primarily described herein with reference to the interaction server system 110 and interaction client 104 of FIG. 1. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The interaction server system 110 receives, from the interaction client 104 (e.g., mobile device 114) of a user, an indication of first user input to select recipients for a message generated by the user (block 802). In response to receiving the indication of first user input, the interaction server system 110 determines a first set of candidate recipients, from among plural candidate recipients, having a respective active content collection associated therewith (block 804). In addition, the interaction server system 110 determines a second set of candidate recipients, from among the plural candidate recipients, having available location data associated therewith (block 806).

The interaction server system 110 causes the interaction client 104 to display a recipient selection interface with a respective cell for each of the plural candidate recipients (block 808). The recipient selection interface differentiates display of the respective cells for the first set of candidate recipients, and further differentiates display of the respective cells for the second set of candidate recipients.

Each respective cell for the plural candidate recipients may be user-selectable to add a recipient for the message, and each respective cell for the plural candidate recipients may include an avatar. The avatar for each candidate recipient within the first set of candidate recipients is user-selectable to perform an action other than adding a recipient for the message.

For example, the interaction server system 110 may receive, from the interaction client 104, an indication of second user input selecting the avatar for a first candidate recipient within the first set of candidate recipients. In response to receiving the indication of second user input, the interaction server system 110 may cause the interaction client 104 to display the respective active content collection associated with the first candidate recipient, rather than adding the first candidate recipient as a recipient for the message. Alternatively or in addition, in response to receiving the indication of second user input, the interaction server system 110 may cause the interaction client 104 to display a friendship profile page associated with the first candidate recipient and the user, rather than adding the first candidate recipient as a recipient for the message.

The recipient selection interface may differentiate display for the first set of candidate recipients by including a ring around the avatars for the first set of candidate recipients. Alternatively or in addition, the recipient selection interface may differentiate display for the first set of candidate recipients by including text, indicating a time the respective active content collection was created, within the respective cells for the first set of candidate recipients.

The recipient selection interface may differentiate display for the second set of candidate recipients by including text, indicating a location and time last seen based on the respective available location data, within the respective cells for the second set of candidate recipients. The respective cells for the plural candidate recipients may include full-width cells and split-width cells, with the text being included in the full-width cells and not included in the split-width cells.

Machine Architecture

Figure 9:
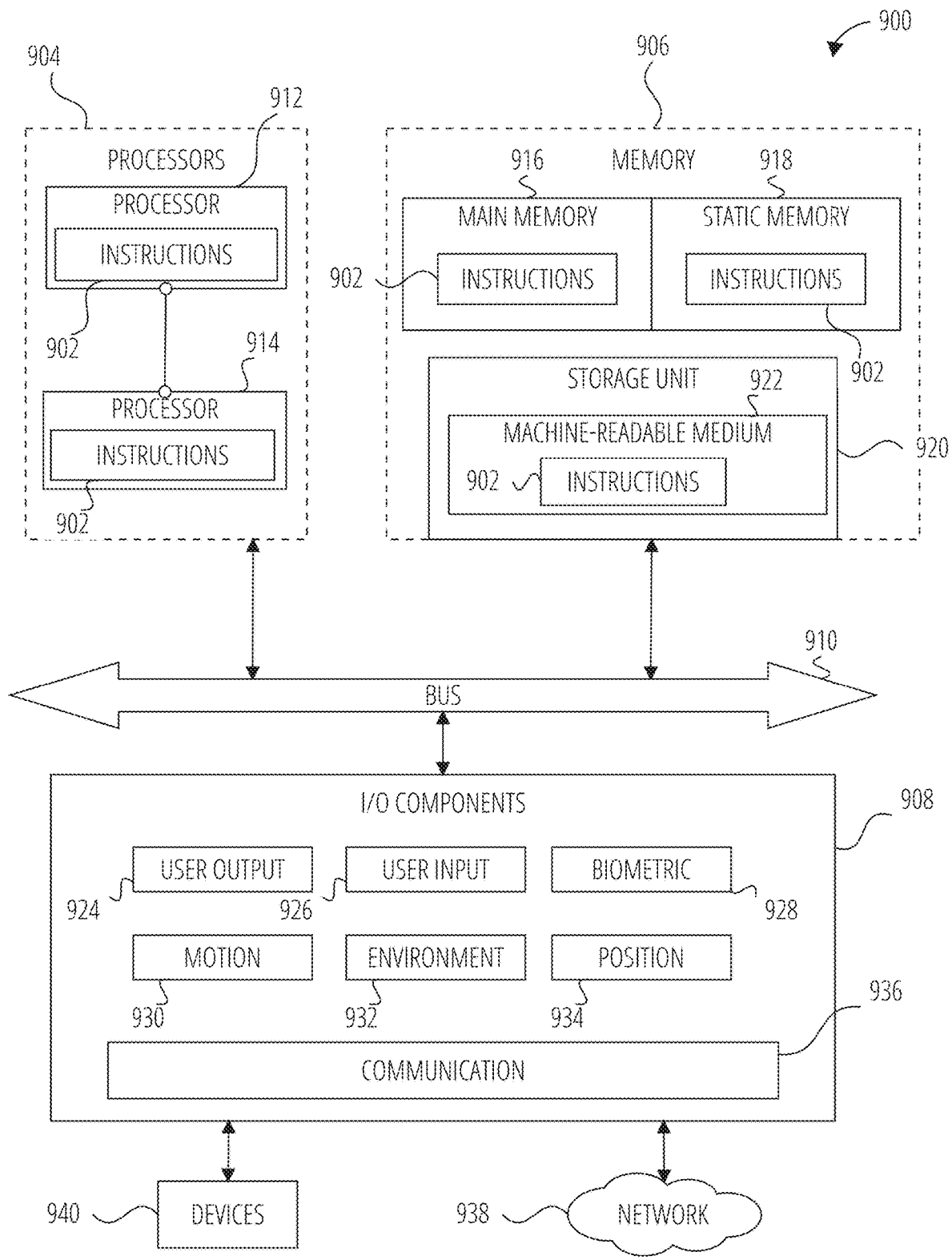
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the interaction server system 110. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e g, Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Software Architecture

Figure 10:
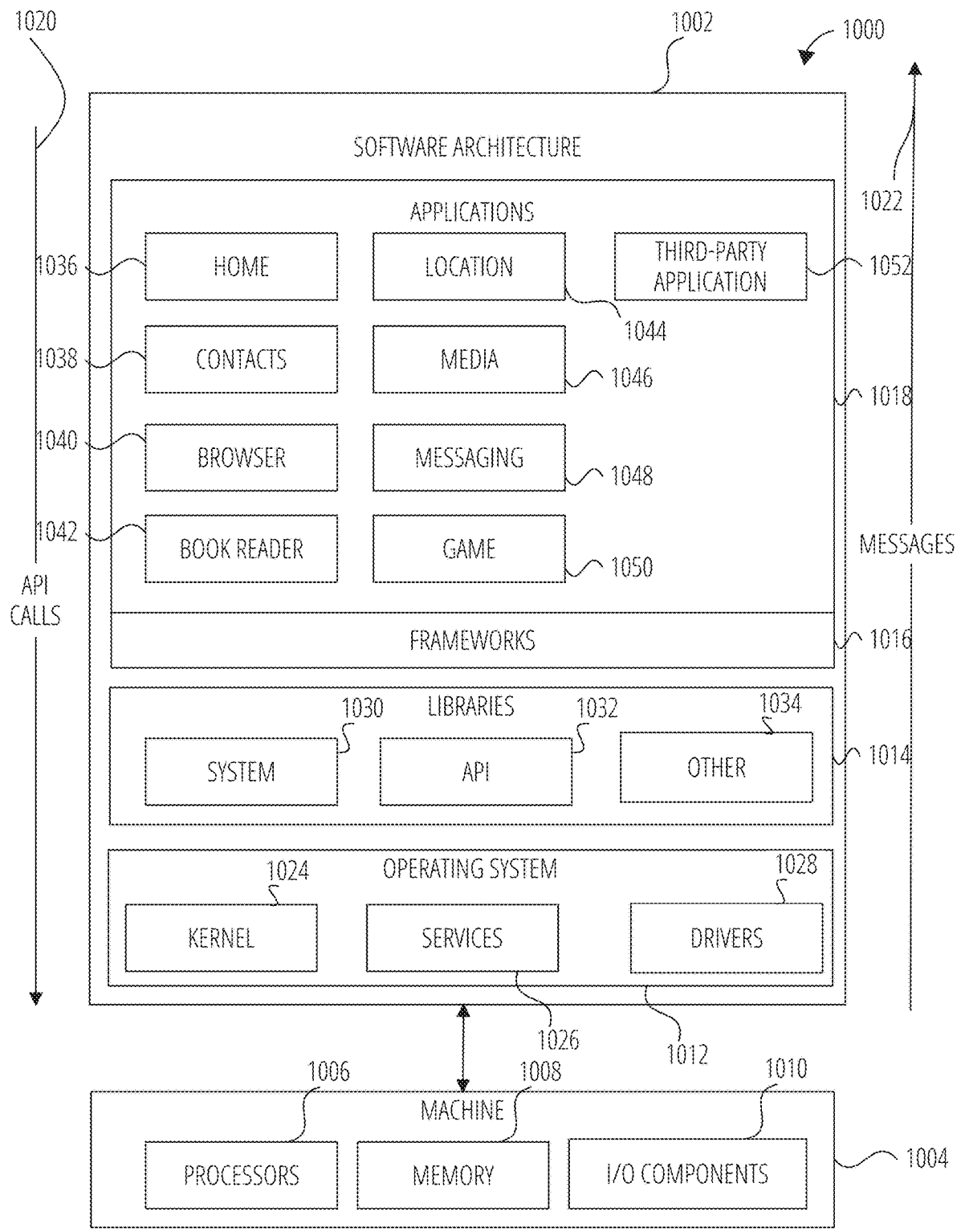
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

Conclusion

Thus, the interaction system 100 as described herein provides for displaying contextual data within a recipient selection interface. The recipient selection interface lists candidate recipients (e.g., contacts, friends) of a user, and allows the user to select which recipients are to receive a message (e.g., a media content item generated by the user). The contextual data within the recipient selection interface indicates which candidate recipients have an active content collection, where an active content collection corresponds to a collection of media content that has been updated within a predefined time period (e.g., 24 hours). The recipient selection interface may depict a circle around the avatar of those candidate recipients. User selection of a circled avatar may provide for playback of the corresponding content collection, or may surface a friendship profile associated with the user and candidate recipient corresponding to the selected circled avatar. The contextual data may further indicate which candidate recipients have available location data, where the location data is made available by privacy settings as set by the candidate recipients. The recipient selection interface may include supplemental text (e.g., subtext) together with the names and avatars of those candidate recipients.

The contextual data provided by the interaction system 100 facilitates in identifying candidate recipients with active content collections and/or available location data. Without providing such contextual data, end users may be required to manually navigate away from the recipient selection interface to other user interface(s) to identify candidate recipients with active content collections and/or available location data. For example, the user may wish to send a message (e.g., media content item) to candidate recipients with active content collections (e.g., as this suggests recent interaction) and/or candidate recipients in a certain geographical areas (e.g., nearby). As such, the interaction system 100 saves time for the user, and/or reduces computational resources/processing power associated with navigating to other user interfaces. Moreover, the contextual data may be more engaging for users of the interaction system 100.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A system comprising:
   a processor; and
   a memory storing instructions that, when executed by the processor, configure the processor to perform operations comprising:
   receiving, from a device of a user, an indication of first user input to select recipients for a message generated by the user;
   in response to receiving the indication of first user input, determining a first set of candidate recipients from among plural candidate recipients, based on each candidate recipient within the first set of candidate recipients having a respective active content collection, each respective content collection comprising plural media content items, and determining a second set of candidate recipients from among the plural candidate recipients, based on each candidate recipient within the second set of candidate recipients having available location data;

causing the device to display a recipient selection interface with a respective cell for each of the plural candidate recipients, wherein the recipient selection interface differentiates display of the respective cells for the first set of candidate recipients, and further differentiates display of the respective cells for the second set of candidate recipients, wherein each respective cell for the plural candidate recipients is user-selectable to add a recipient for the message, wherein each respective cell for the plural candidate recipients includes an avatar, and wherein the avatar for each candidate recipient within the first set of candidate recipients is user-selectable to perform an action other than adding a recipient for the message;

receiving, from the device, an indication of second user input selecting the avatar for a first candidate recipient within the first set of candidate recipients; and causing, in response to receiving the indication of second user input, the device to automatically advance through the plural media content items of the respective active content collection associated with the first candidate recipient, rather than adding the first candidate recipient as a recipient for the message.

2. The system of claim 1, wherein the recipient selection interface differentiates display for the first set of candidate recipients by including a ring around the avatars for the first set of candidate recipients, and wherein the ring for the first candidate recipient changes color after automatically advancing through the plural media content items of the respective active content collection associated with the first candidate recipient.

3. The system of claim 1, wherein the recipient selection interface differentiates display for the first set of candidate recipients by including text, indicating a time the respective active content collection was created, within the respective cells for the first set of candidate recipients.

4. The system of claim 1, wherein the recipient selection interface differentiates display for the second set of candidate recipients by including text, indicating a location and time last seen based on the respective available location data, within the respective cells for the second set of candidate recipients.

5. The system of claim 4, wherein the respective cells for the plural candidate recipients include full-width cells and split-width cells, and wherein the text is included in the full-width cells and not included in the split-width cells.

6. A method, comprising:

receiving, from a device of a user, an indication of first user input to select recipients for a message generated by the user;

in response to receiving the indication of first user input, determining a first set of candidate recipients from among plural candidate recipients, based on each candidate recipient within the first set of candidate recipients having a respective active content collection, each respective content collection comprising plural media content items, and determining a second set of candidate recipients from among the plural candidate recipients, based on each candidate recipient within the second set of candidate recipients having available location data;

causing the device to display a recipient selection interface with a respective cell for each of the plural candidate recipients, wherein the recipient selection interface differentiates display of the respective cells for the first set of candidate recipients, and further differentiates display of the respective cells for the second set of candidate recipients, wherein each respective cell for the plural candidate recipients is user-selectable to add a recipient for the message, wherein each respective cell for the plural candidate recipients includes an avatar, and wherein the avatar for each candidate recipient within the first set of candidate recipients is user-selectable to perform an action other than adding a recipient for the message;

receiving, from the device, an indication of second user input selecting the avatar for a first candidate recipient within the first set of candidate recipients; and causing, in response to receiving the indication of second user input, the device to automatically advance through the plural media content items of the respective active content collection associated with the first candidate recipient, rather than adding the first candidate recipient as a recipient for the message.

7. The method of claim 6, wherein the recipient selection interface differentiates display for the first set of candidate recipients by including a ring around the avatars for the first set of candidate recipients, and wherein the ring for the first candidate recipient changes color after automatically advancing through the plural media content items of the respective active content collection associated with the first candidate recipient.

8. The method of claim 6, wherein the recipient selection interface differentiates display for the first set of candidate recipients by including text, indicating a time the respective active content collection was created, within the respective cells for the first set of candidate recipients.

9. The method of claim 6, wherein the recipient selection interface differentiates display for the second set of candidate recipients by including text, indicating a location and time last seen based on the respective available location data, within the respective cells for the second set of candidate recipients.

10. The method of claim 9, wherein the respective cells for the plural candidate recipients include full-width cells and split-width cells, and wherein the text is included in the full-width cells and not included in the split-width cells.

11. A non-transitory computer-readable storage medium, the computer-readable storage medium including instructions that when executed by a computer, cause the computer to perform operations comprising:

receiving, from a device of a user, an indication of first user input to select recipients for a message generated by the user;

in response to receiving the indication of first user input, determining a first set of candidate recipients from among plural candidate recipients, based on each candidate recipient within the first set of candidate recipients having a respective active content collection, each respective content collection comprising plural media content items, and determining a second set of candidate recipients from among the plural candidate recipients, based on each candidate recipient within the second set of candidate recipients having available location data;

causing the device to display a recipient selection interface with a respective cell for each of the plural candidate recipients, wherein the recipient selection interface differentiates display of the respective cells for the first set of candidate recipients, and further differentiates display of the respective cells for the second set of candidate recipients, wherein each respective cell for the plural candidate recipients is user-selectable to add a recipient for the message, wherein each respective cell for the plural candidate recipients includes an avatar, and wherein the avatar for each candidate recipient within the first set of candidate recipients is user-selectable to perform an action other than adding a recipient for the message;

receiving, from the device, an indication of second user input selecting the avatar for a first candidate recipient within the first set of candidate recipients; and causing, in response to receiving the indication of second user input, the device to automatically advance through the plural media content items of the respective active content collection associated with the first candidate recipient, rather than adding the first candidate recipient as a recipient for the message.

* * * * *